INVENTORS
Ulrich Englert
Konrad Däbritz

BY Polachek & Saulsbury
ATTORNEYS

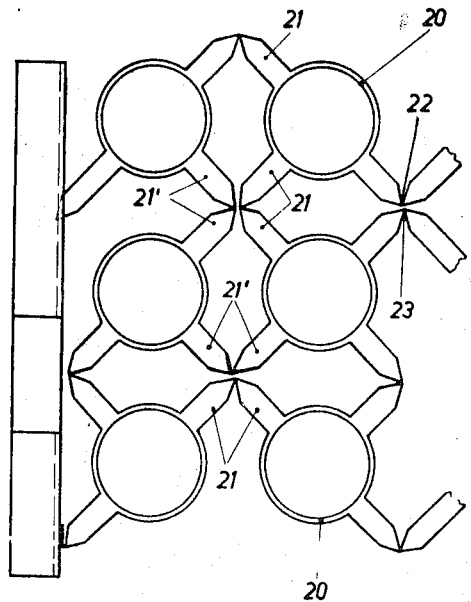
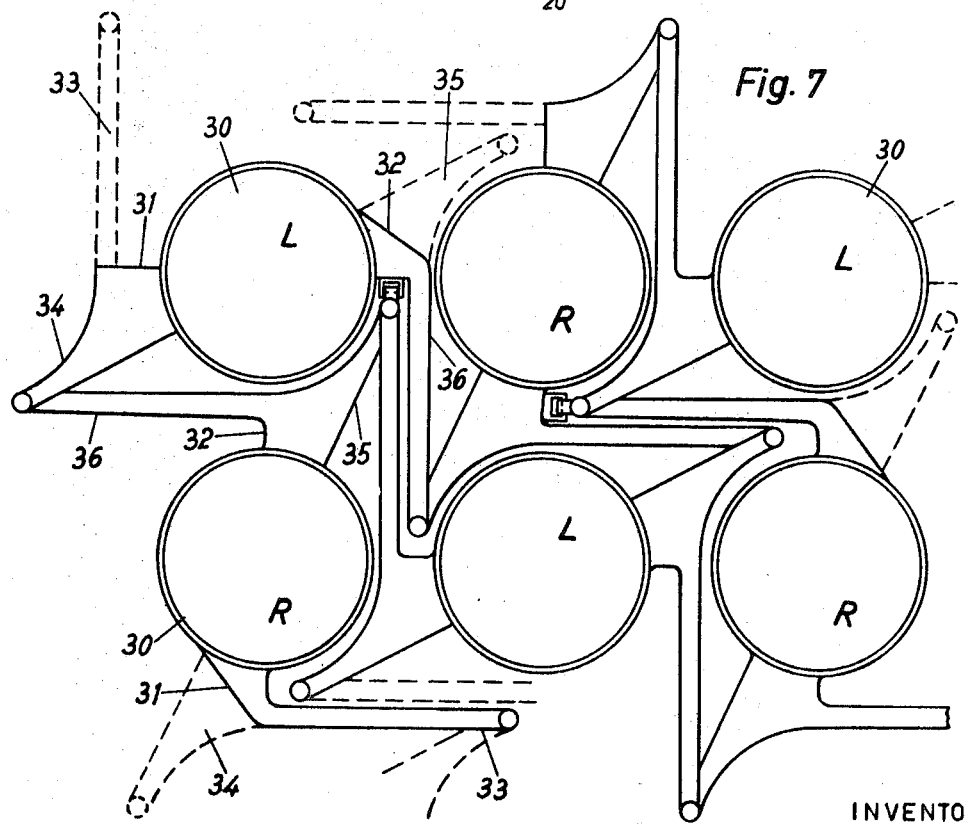

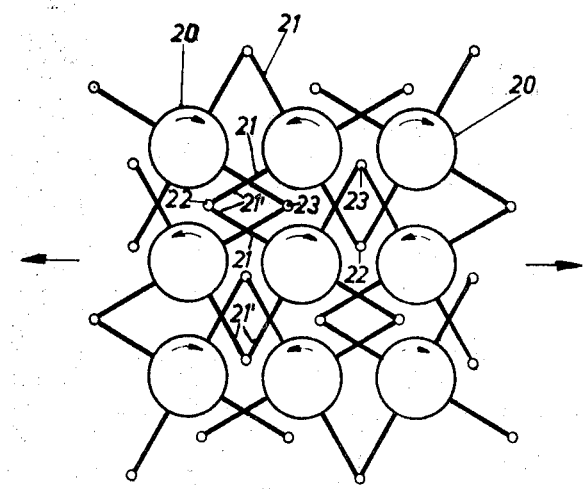
Fig. 5
Fig. 6
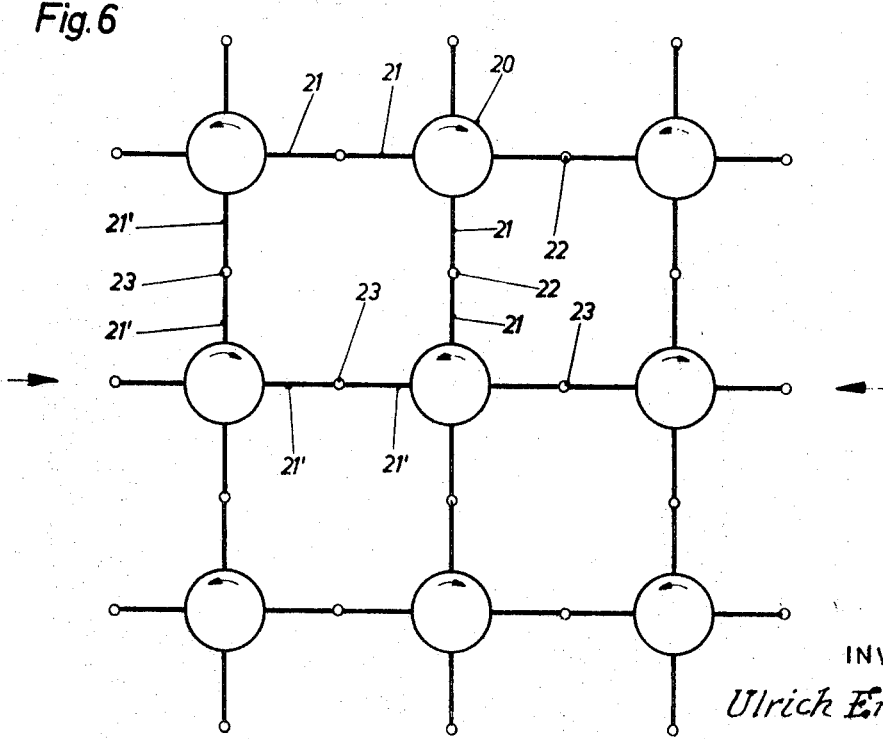

Oct. 26, 1971 U. ENGLERT ET AL 3,615,026
APPARATUS FOR SHIFTING FLOWER POTS AND FOR
LIFTING AND LOWERING SUCH POTS IN
GARDENING NURSERIES
Filed June 20, 1968 9 Sheets-Sheet 4

INVENTORS
Ulrich Englert
Konrad Däbritz

BY Polachek & Saulsbury
ATTORNEYS

INVENTORS
Ulrich Englert
Konrad Däbritz
BY Polachek Hausbury
ATTORNEYS

Oct. 26, 1971         U. ENGLERT ET AL         3,615,026
APPARATUS FOR SHIFTING FLOWER POTS AND FOR
LIFTING AND LOWERING SUCH POTS IN
GARDENING NURSERIES
Filed June 20, 1968                    9 Sheets-Sheet 6

INVENTORS
Ulrich Englert
Konrad Däbritz

BY Palachek & Saulsbury
ATTORNEYS

INVENTORS
Ulrich Englert
Konrad Däbritz

BY Polachek & Saulsbury
ATTORNEYS

United States Patent Office 3,615,026
Patented Oct. 26, 1971

3,615,026
APPARATUS FOR SHIFTING FLOWER POTS AND FOR LIFTING AND LOWERING SUCH POTS IN GARDENING NURSERIES
Ulrich Englert, Horrheim, Wurttemberg, Germany, and Konrad Dabritz, Konigsbergerstr. 31, Muhlacker, Wurttemberg, Germany
Filed June 20, 1968, Ser. No. 738,493
Claims priority, appplication Germany, June 24, 1967, P 15 82 719.7; Dec. 18, 1967, P 15 82 722.2
Int. Cl. A47g 29/00
U.S. Cl. 211—80
4 Claims

ABSTRACT OF THE DISCLOSURE

Extension arms are connected to a plurality of flower pot holders, each of which is adapted to receive a flower pot. The extension arms are relatively movably connected to each other so that said holders and arms form a grid structure in which the spacing of said holders is variable. A series of forks, each of which is adapted to embrace and support a pot, are connected by a linkage, which is provided with handles operable to vary the spacing of said forks.

---

This invention relates to an apparatus for shifting flower pots in gardening nurseries.

The flower pots in which plants are being grown from seeds or cuttings closely spaced in gardening on the shelves of greenhouses, in order to save space. As the plants grow, the pots must be moved apart to provide the space required by each plant. So far, each flower pot had to be grasped and shifted to the new place by hand. The need for this time-consuming and monotonous work is eliminated by the apparatus according to the invention because this apparatus enables a shifting apart or together of numerous flower pots at a time.

In the apparatus according to the invention, this advantage is afforded in that the flower pots are held in holders, which are connected by relatively pivotally movable or slidable extension arms in a grid structure, in which the spacing of the flower pots can be varied. This inventive concept can be realized in various ways.

For instance, the receivers may consist of plates provided with two pairs of extension arms, which extend at right angles to each other and are longitudinally slidable in corresponding bores of two adjacent plates. In this arrangement, the holders of a horizontal or vertical series can be jointly shifted.

Another possibility of jointly changing the spacing of all holders is to provide the holders on arms, which are articulatedly connected to each other, and to guide each of the outer arms on one of two parallel rails, the spacing of which is variable by a telescopic linkage.

In another embodiment of this apparatus which uses pivoted arms, each holder has four relatively short, radial arms, which are aligned in pairs, and such pairs cross each other. By these arms, each holder is pivoted to one of the arms associated with each of the adjacent holders. To increase the range of adjustment, the arms may be attached to the holders in different planes so that the arms overlap when they have been pushed together.

In another embodiment of the apparatus according to the invention, the same purpose, namely, to increase the range of adjustment by a suitable arrangement of the connecting arms, is ensured in that two extensions provided on each holder are forked to form two arms each and the spaces between such arms receive the arms associated with the adjacent holders when the holders have been pushed together.

In another embodiment of the apparatus according to the invention, the holders consist of square plates, each of the four side edges of said plates is continued in one direction by a rigid arm, and four of said arms associated with respective holders are pivoted at their ends to respective corners of armless square holder plates.

In these apparatus, individual pots must still be individually placed into or removed out of respective holders.

The object to enable a joint handling of a plurality of pots in this case too is accomplished according to another feature of the invention by an accessory, in which the spacing of the forks embracing respective individual pots and arranged in a row is variable.

An improved apparatus according to the invention is characterized in that the holders themselves constitute flower pots. Such apparatus eliminates the need for a pricking-out box and for transplanting. According to the previous practice, the plants were transplanted first from the rigid pricking-out box into small flower pots and subsequently from the small flower pots into larger flower pots, which are sold with the plants.

In the improved apparatus which has been described, the plants may be grown from seeds and the apparatus may be extended to increase the spacing of the plants in accordance with the growth thereof until the plants can be transplanted into the large flower pots in which they are subsequently sold.

Another advantage will be afforded by the invention if the flanges of the pots abut in a flush relation when the holders have been pushed together because the earth for the plants can then be filled into all pots at one time in that the earth is poured and subsequently scraped off.

The drawing shows diagrammatically and partly in section a plurality of preferred illustrative embodiments of a flower pot-shifting apparatus according to the invention.

FIG. 4 shows a second embodiment of the apparatus according to the invention, where each holder is provided with four radial arms, which are articulatedly connected to respective arms of adjacent holders.

FIG. 5 is a diagrammatic view showing the apparatus according to FIG. 4 with the holders pushed together.

FIG. 6 is a diagram showing the apparatus of FIG. 4 in an extended position.

FIG. 7 shows another embodiment of the invention, in which each holder has two extensions and each of said extensions is forked to form two arms, which are articulatedly connected to arms of adjacent holders in accordance with FIG. 4.

Figure 14:
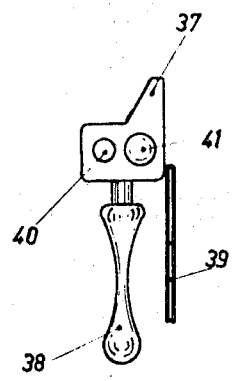
FIG. 14 is a front elevation showing the apparatus of FIGS. 12 and 13.
Figure 13:
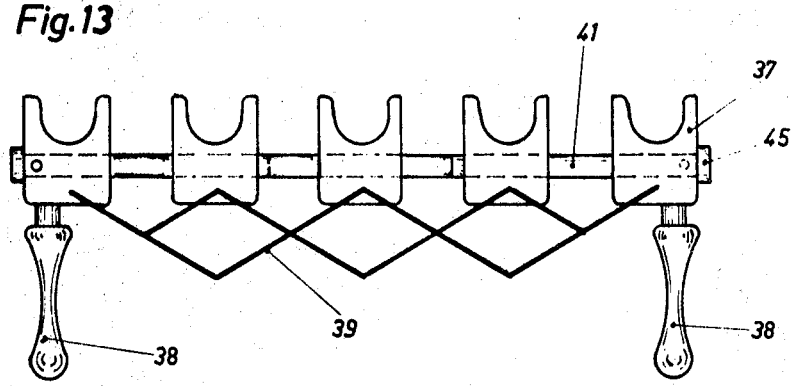
FIG. 13 is a top plan view showing the accessory in an extended position.
Figure 15:
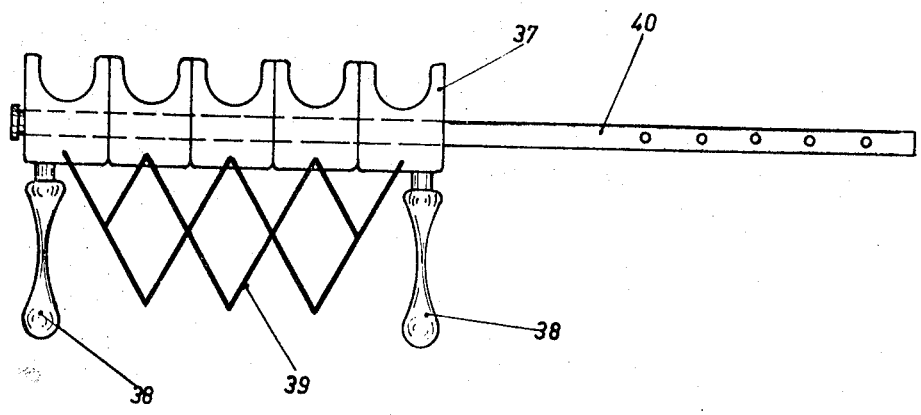
Figure 16:
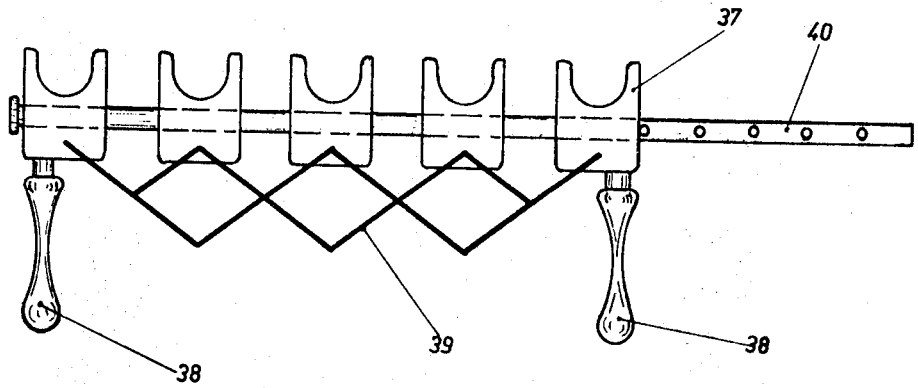

FIGS. 15 and 16 respectively show a modification of the accessory of FIGS. 13 to 15 pushed together and extended.

Figure 17:
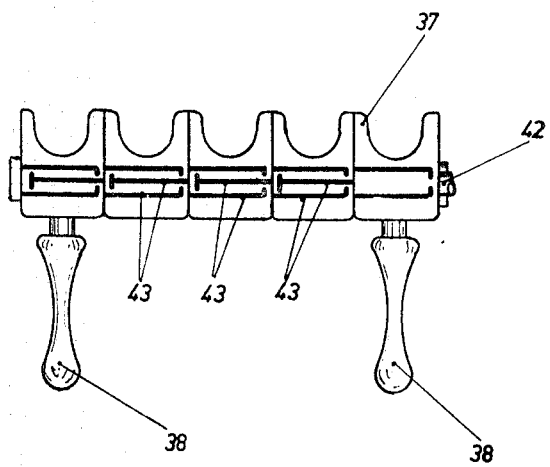
Figure 19:
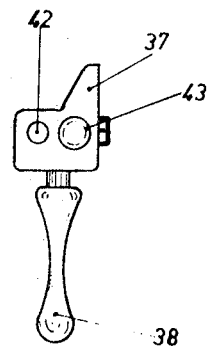
Figure 18:
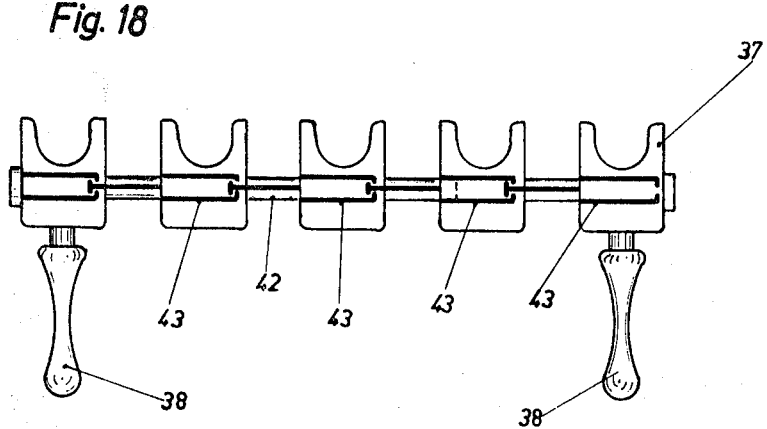

FIGS. 17, 18 and 19 respectively, show a further modification of the accessory of FIGS. 13 to 15 pushed together and extended and in front elevation.

Figure 20:
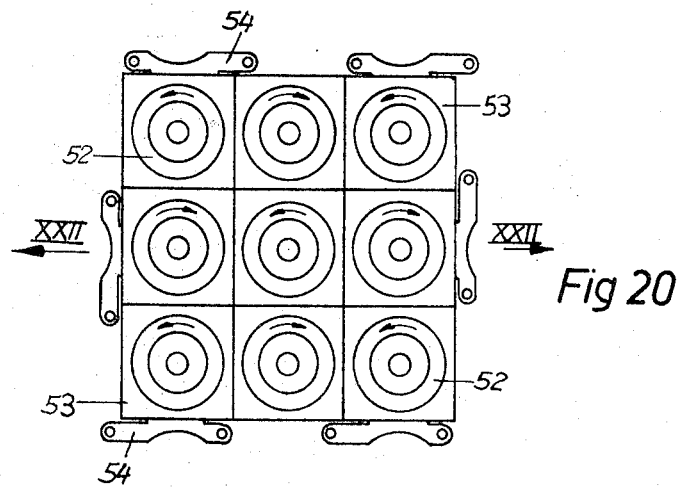

FIG. 20 shows apparatus in which the pot holders constitute pots themselves, with the holders pushed together.

Figure 21:
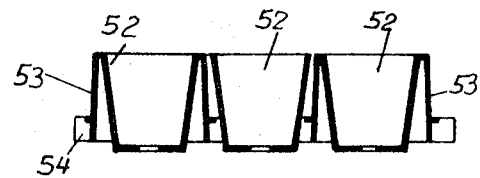

FIG. 21 shows the apparatus according to FIG. 20 in an extended position and

Figure 22:
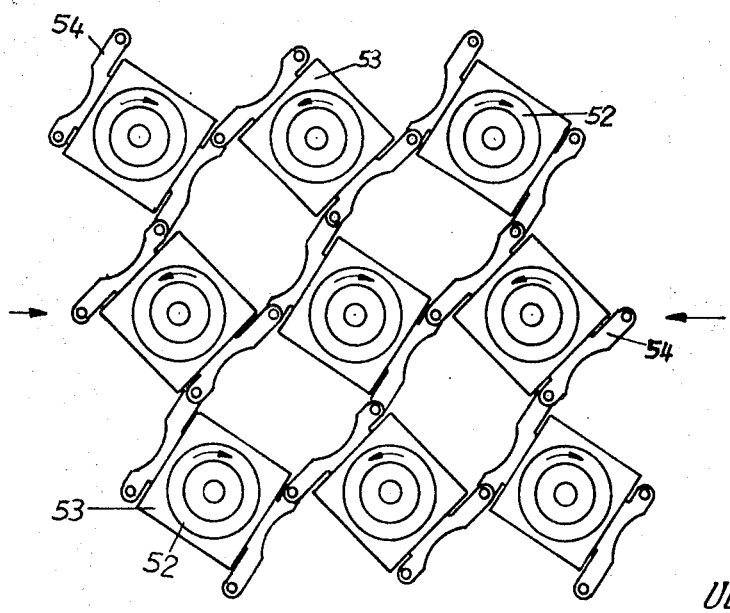

FIG. 22 is a sectional view taken on line XXII—XXII in FIG. 20.

Figure 1:
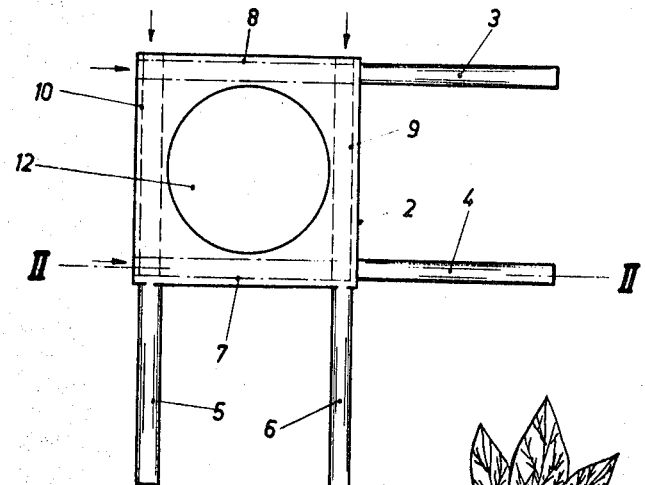
FIG. 1 shows a flower pot holder consisting of a square plate and two pairs of extension arms.
Figure 2:
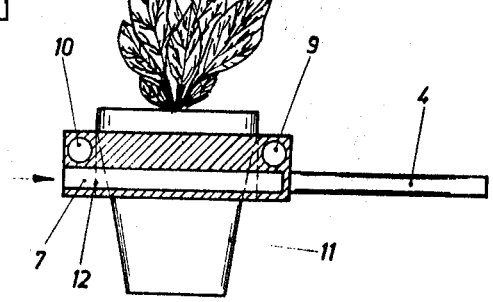
FIG. 2 is a sectional view taken on line II—II in FIG. 1.

The plate 2 in FIG. 1 has a hole 12 for receiving the flower pot 11 and two pairs of arms 3, 4 and 5, 6. These arms fit in bores 7, 8 and 9, 10 of two adjacent plates. The arms 3, 4 and 5, 6 of two further adjacent plates fit in bores 7, 8 and 9, 10 of the plate of FIG. 1. Each horizontal and vertical series of holders can thus be pushed away from the adjacent holders.

Figure 3:
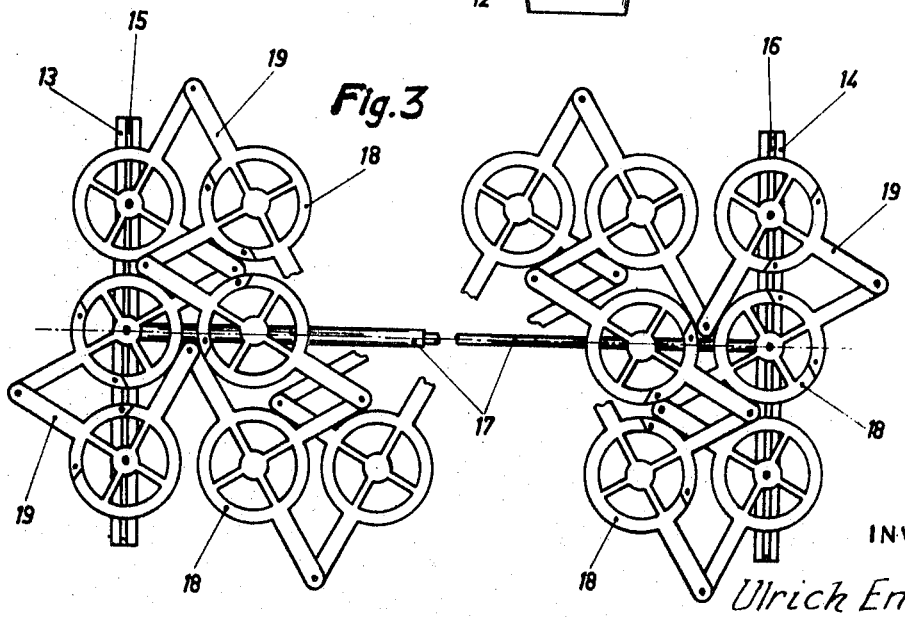
FIG. 3 shows an embodiment of an apparatus according to the invention.

In the apparatus according to FIG. 3, the rails 13 and 14 are connected to a rod 17, which is telescopically extensible. Holders 18 are disposed between the two rails 13 and 14 and are pivotally connected by arms 19 as by lazy tongs. The outermost ends of the arms 19 are guided with pins in grooves 16 of the rails 13 and 14.

In the embodiment shown in FIGS. 4, 5 and 6, each holder 20 has four arms 21, 21' and said arms are pivoted to respective arms of the adjacent holders. When the holders are pushed together, the pivots 22, 23 strike against each other to limit the range of adjustment. To avoid this, the arms 21' are disposed in another plane than the arms 21 and the arms overlap when the holders are pushed together. This arrangement can also be provided with two parallel guide rails on opposite side edges, just as in the embodiment of FIG. 3.

Figure 8:
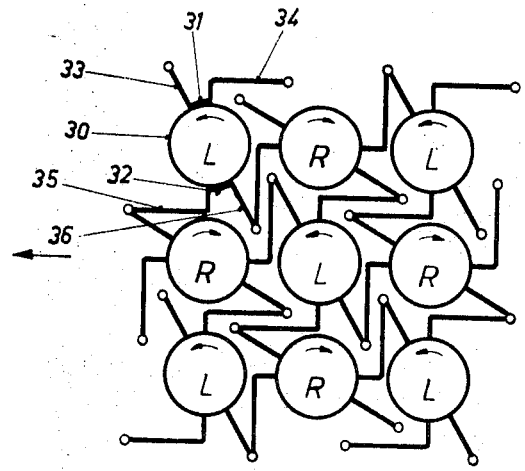
FIG. 8 is a diagrammatic view showing the apparatus according to FIG. 7 with the holders pushed together.
Figure 9:
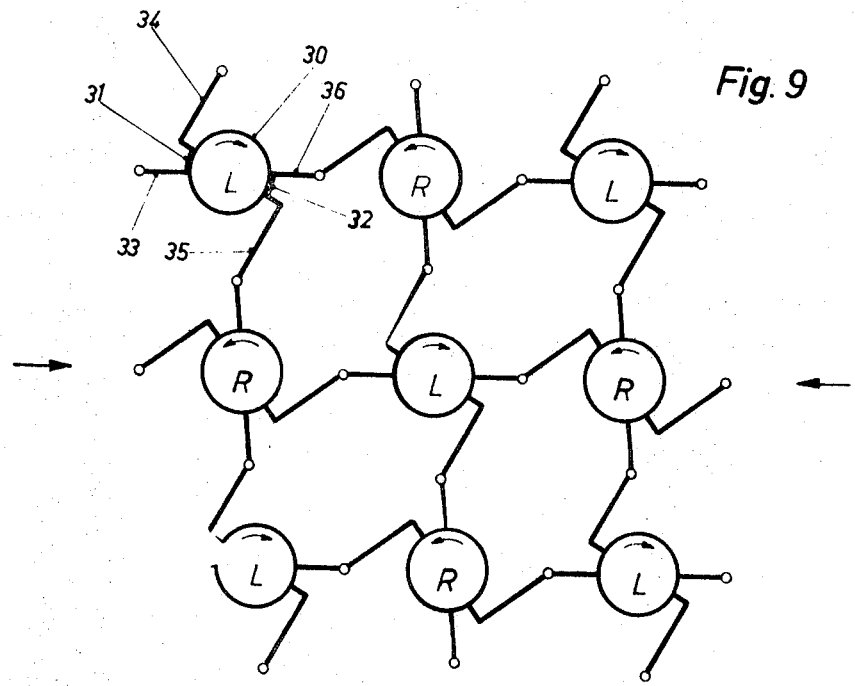
FIG. 9 is a diagrammatic view showing the apparatus of FIG. 8 in an extended position.

In FIGS. 7, 8 and 9, each holder 30 has two extensions 31, 32 and each of said extensions is forked to form two arms 33, 34 and 35, 36. The arms are pivotally connected as shown and when pushed together enter the spaces between other arms. When the holders are made from plastics materials, a mold may be used which is installed in alternation in positions which are offset by an angle of 180° and in the plane of the drawing by an angle of 90° (R=right, L=left).

Figure 10:
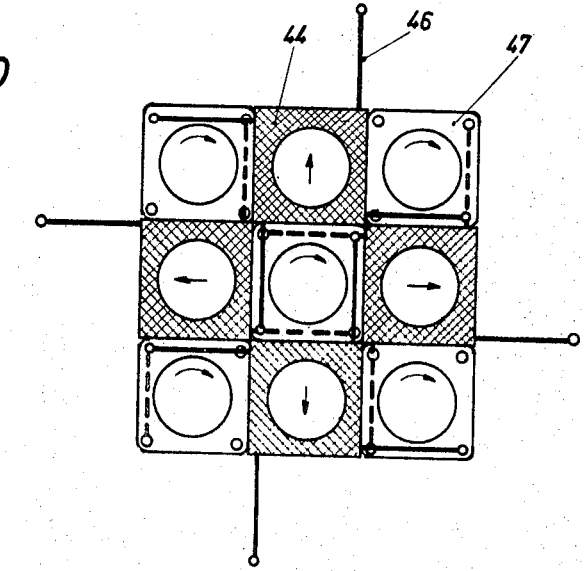
FIG. 10 shows another embodiment of the invention with the holders pushed together.
Figure 11:
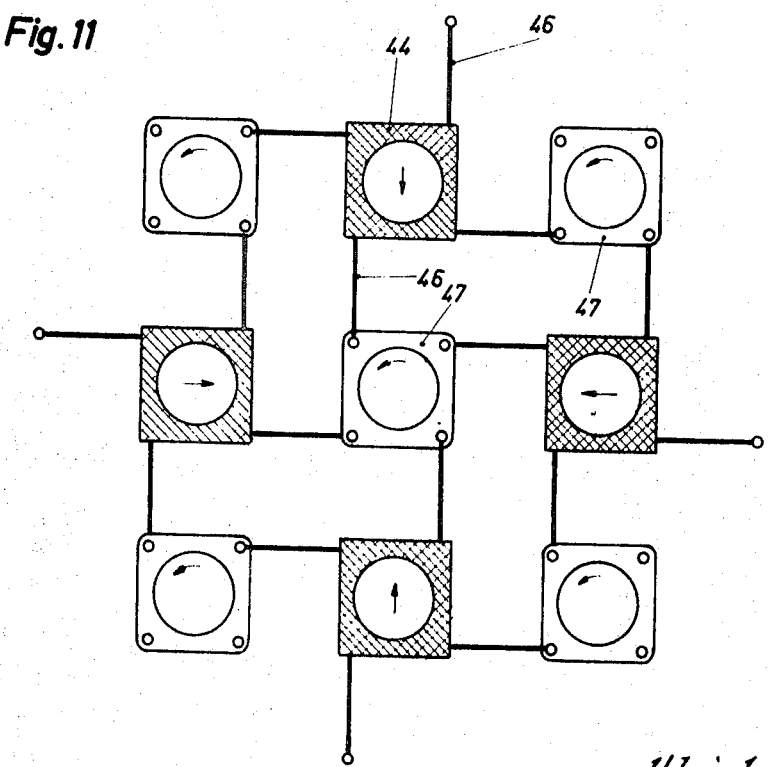
FIG. 11 shows the apparatus of FIG. 10 in an extended position.

In the embodiment shown in FIGS. 10 and 11, the holders comprise two types of square plates. The plates 44 of one type have lateral arms 46 extending in all four directions and the plates 47 of the other type has no arms. Arms extending from four different plates 44 are pivoted to four corners of each armless holder plate 47.

The apparatus shown in FIGS. 12 to 19 for a joint placing and lifting of a series of flower pots into and out of one of the apparatus shown in FIGS. 1 to 11 may be used alone if the flower pots are arranged in only one row.

Figure 12:
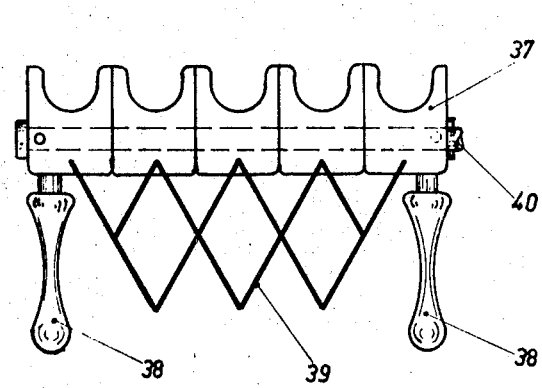
FIG. 12 is a top plan view showing an accessory pushed together.

In the embodiment of this apparatus shown in FIGS. 12 to 14, the forks 37 are slidable on a rod 40 and are interconnected by telescopic rods 41 and lazy tongs 39 having handles 38.

In the embodiment shown in FIGS. 15 and 16, the forks can be located on the rod 40 in a predetermined position by pins which are inserted into the rod.

In the embodiment shown in FIGS. 17 to 19, the forks 37 are slidable on a rod 42 and are interconnected only by stop pins 43.

In the embodiment shown in FIGS. 20 to 22, the pots 52 consisting preferably of plastics material have flanges 53, which are flush and abut when the holders are pushed together. When the pots are pulled apart in the direction of the arrow in FIG. 20, the individual pots rotate in the direction of the arrows therein. The pivoted connecting arms 54 correspond to the arms 3, 4, 5 and 6 of the apparatus described first.

What is claimed is:

1. Apparatus for shifting flower pots in gardening nurseries which comprises a plurality of flower pot holders, each of which is adapted to receive a flower pot, and extension arms connected to said holders and relatively movably connected to each other so that said holders and arms form a grid structure in which the spacing of said holders is variable and said extension arms are pivoted to each other.

2. Apparatus as set forth in claim 1 which comprises two parallel rails, a telescopic linkage connecting said rails and adapted to vary the spacing thereof, and articulated joints between said arms, said arms being guided by said rails.

3. Apparatus as set forth in claim 1, in which four radial arms are provided on each holder and pivoted each to one arm of each of the four adjacent holders.

4. Apparatus as set forth in claim 2, in which said arms provided on each holder form two pairs of arms lying in different planes so that arms in different planes are adapted to overlap when said holders are closely spaced.

References Cited

UNITED STATES PATENTS

| | | | |
|---|---|---|---|
| 159,676 | 2/1875 | Hills | 211—81 X |
| 245,563 | 8/1881 | Rouse | 211—81 X |
| 327,991 | 10/1885 | Baumann | 211—168 X |
| 342,476 | 5/1886 | Swartwout | 211—81 X |
| 710,797 | 10/1902 | Norden | 211—168 X |
| 1,443,420 | 1/1923 | Lennox | 211—81 X |

NILE C. BYERS, JR., Primary Examiner